Patented Oct. 1, 1940

2,216,689

UNITED STATES PATENT OFFICE 2,216,689

PRINTING INK

Louis M. Larsen, Rutherford, N. J., assignor to The International Printing Ink Corporation, New York, N. Y., a corporation of Ohio No Drawing. Application December 12, 1936, Serial No. 115,535

2 Claims. (Cl. 134—36)

This invention relates to improved printing inks, and more particularly to improvements in printing inks adapted for typographic and lithographic printing.

It has long been desirable to incorporate a substantial amount of waxy material in printing inks, in order to reduce the tack of the ink and assist in preventing it from rubbing off. However, while ordinary commercial paraffin waxes have been used in small quantities, it has been found that substantial amounts of these waxes cause the ink to become granular on ageing. Since a printing ink must have a uniform and homogeneous body for good printing, such granular inks are unsatisfactory, and are not acceptable to printers.

I have discovered that by employing a wax known as "Syncera," I am able to incorporate upwards of 2 per cent. of such wax in a printing ink, with the production of an ink having minimum tack and non-rubbing qualities, and without the disadvantage of granulation on ageing. I have found that the present invention is particularly useful and important in connection with those inks which contain a large proportion of binder, such as typographic printing inks containing upwards of 20 per cent. of drying oil, or other binder. A particular feature of the invention thus lies in the improvement of printing inks which have a yield value of more than 1,000 dynes and a viscosity of about 20 poises or more. Granulation, in such inks, is apt to produce marked and undesirable changes in the yield values and viscosities of these inks. Thus, a particular feature of the invention lies in the improvement of inks of this character.

"Syncera" wax is marketed by Standard Oil Company (Indiana). It is produced from certain petroleum stocks and has a melting point between 120° F. and 160° F. (preferably about 145° F., for printing ink); its crystals are unusually small (ordinarily less than about 40 microns in length), thin as compared to rhombic, and curved at their ends, as viewed under the microscope. Similar waxes, prepared by other oil companies are on the market, and the present invention is, therefore, not restricted to the brand named. Waxes having the characteristics of "Syncera" wax are produced from residual petroleum oil stocks from the California, Texas, Gulf and Mexican fields. After the crudes have been treated to remove paraffin and light oils by distillation, the residue is then treated to remove a fraction containing petrolatum or "Vaseline" and other ingredients including the desired wax. This wax may then be separated from the petrolatum by fractional precipitation or possibly by solvent extraction, and the wax thus separated is then treated to remove dark colored impurities. The characteristics of the wax which I prefer to employ, in order to obtain the improved properties mentioned, are an extremely small particle size when incorporated in a printing ink vehicle, and the ability to remain in the state of fine subdivision or dispersion in printing ink vehicles, over the ordinary periods of time encountered in the distribution and use of such inks.

As examples of inks according to the present invention, I set forth the following:

Example I

| | Parts by weight |
|---|---|
| Pigment (mostly chrome yellow) | 63.2 |
| Vehicle (equal parts of No. 1 body and No. 2 body linseed oil) | 34.5 |
| "Syncera" wax (M. P. 145° F.) | 2.3 |
| Total | 100.0 |

Example II

| | Parts by weight |
|---|---|
| Pigment (carbon black mixed with usual blues) | 27.10 |
| Vehicle (5 parts of petroleum oil, together with 4 parts of binder such as cumaron resin) | 66.25 |
| Pitch | 1.95 |
| "Syncera" wax | 4.70 |
| Total | 100.0 |

It will be appreciated that the ink vehicle of Example I is a drying-oil varnish, while the ink vehicle of Example II is of the type including a solvent and a binder, the solvent being ordinarily evaporated following the printing operation, or, in the case of porous paper, being absorbed by penerating into the paper.

I prefer to employ "Syncera" wax, or the like, to the extent of about 2 per cent. to 6 per cent. of the ink, by weight, and I find that such proportions produce excellent results. However, in some cases, it is possible to employ as much as 10 per cent. of this wax, without granulation difficulties.

Inks according to the present disclosures possess good viscosities and yield values, and are particularly suited for high-speed, rotary, typographic and lithographic printing.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A typographic printing ink comprising a pigment and a drying oil varnish, and 2 per cent. to 10 per cent. of "Syncera" wax.

2. A homogeneous printing ink having a consistency suitable for ordinary typographic printing, consisting essentially of a pigment and a vehicle therefor, said vehicle being composed of one of the group consisting of a drying oil and a normally solid binder dissolved in a solvent, together with "Syncera" wax in amount more than 2 per cent. and less than 10 per cent. of the weight of the ink.

LOUIS M. LARSEN.

CERTIFICATE OF CORRECTION.

Patent No. 2,216,689.   October 1, 1940.

LOUIS M. LARSEN.

It is hereby certified that the above numbered patent was erroneously issued to "The International Printing Ink Corporation, of New York, N. Y., a corporation of Ohio" whereas said patent should have been issued to --Interchemical Corporation, a corporation of Ohio--, as shown by the record of assignments in this office; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.